Patented Jan. 11, 1938

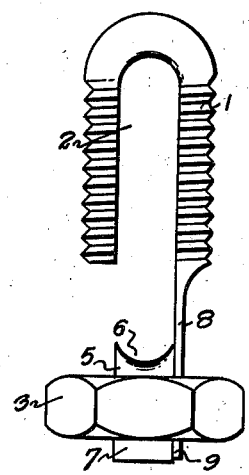
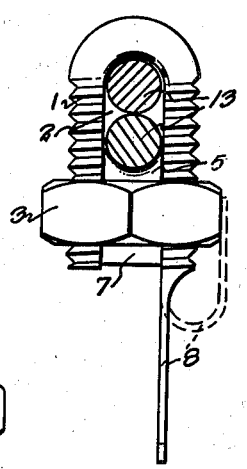
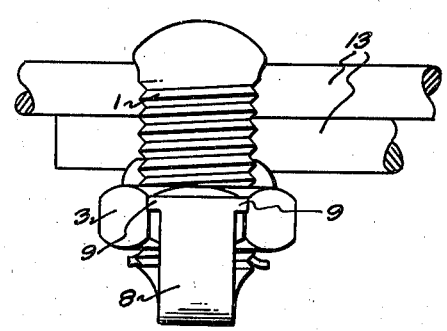
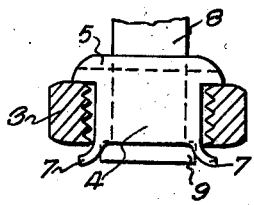
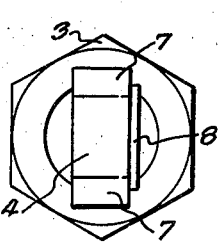
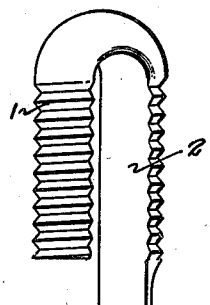
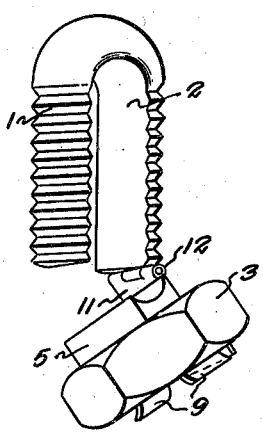

2,105,129

UNITED STATES PATENT OFFICE 2,105,129

WIRE CONNECTER

Frederick George Ridgers, Hamilton, Ontario, Canada, assignor to N. Slater Company Limited, Hamilton, Ontario, Canada, a company of Canada Application January 13, 1933, Serial No. 651,583

2 Claims. (Cl. 173—263)

My invention relates to improvements in wire connecters such as are used for securing a tap or lead off wire to an electric current supply wire, my invention being more particularly directed towards this type of device comprising a bolt portion having a diametrical open ended slot therein for the reception of the wires and a nut threadable upon the bolt for closing the slot and securing the wires in place, and the object of my invention is to furnish this type of device with an extension element for receiving the nut when it is unthreaded from the bolt so that the nut can not be entirely removed from the connecter thus obviating the loss of time and trouble which frequently occurs if the nut is inadvertently dropped during installation.

A further object of my invention is to so construct my device that the addition of the nut supporting element does not materially increase its cost and a still further object of my invention is to utilize such nut supporting element, which is preferably in the form of a bendable tongue, as a means for locking the tightened nut against rotation.

My invention consists of a wire connecter constructed and arranged all as hereinafter more particularly described and illustrated in the accompanying drawing in which:

Fig. 1 is an end elevational view of my device in the open position for the reception of the wires.

Fig. 2 is a similar view to Fig. 1 showing the wires inserted in the device and the nut threaded unto the bolt portion to close the slot and retain the wires in place, the tongue being shown in dotted lines bent over to lock the nut.

Fig. 3 is a front elevational view of the device as illustrated in Fig. 2, the tongue being shown bent over in full lines.

Fig. 4 is a vertical cross sectional view through the nut showing a washer member contained therein together with a fragmentary portion of the tongue.

Fig. 5 is an inverted plan view of my device as illustrated in Fig. 2.

Fig. 6 is a perspective view of my device before the nut is positioned thereon in assembly, a slightly different form of lug being shown for retaining the nut on the tongue, and Fig. 7 is a perspective view of an alternative construction wherein the nut receiving tongue is hinged to the bolt portion.

Like characters of reference indicate corresponding parts in the different views in the drawing.

The connecter to which my invention is applied comprises a bolt 1 formed with a diametrical open ended slot 2 therein, the slot opening into the nut receiving end of the bolt and 3 is a nut receivable upon the bolt for closing the slot and securing the contained wires in place.

The nut 3 contains a washer element comprising a block 4 diametrically positioned within the orifice in the nut and formed at its wire contacting end with a T-shaped head 5 having a wire receiving groove 6 therein, the ends of the groove being chamfered to prevent them cutting the wire. The lower end of the block 4, which is free within the nut, is provided with a pair of lugs 7 bent outwardly round the edge of the orifice in the nut so as to retain the washer element in place. The washer element is of slightly less width than the slot 2 to enable it to freely slide therein, and as one of its functions, prevents the leg portions formed by the slotted bolt from being squeezed together when the nut is applied and tightened up.

For retaining the nut 3 from entire removal from the connecter when it is unthreaded from the bolt 1, I furnish a tongue 8 protruding from the nut receiving end of the bolt. This tongue extends through the orifice in the nut and lies beside one side face of the washer element, being furnished at its free end with a stop to prevent the removal of the nut therefrom.

The stop can obviously be of one of a variety of forms, as for example in Figs. 1 and 3, I show the bottom of the tongue 8 furnished with a pair of corner lugs 9 which engage the face of the nut, and in Fig. 6 show the tongue provided in the vicinity of its free end with a lug 10 which is pressed out from the tongue intermediately of its width, the lug being bent outwardly to engage the face of the nut and prevent its removal.

I have found it of particular advantage to form the tongue 8 so that it is substantially pliable, whereby, when the nut 3 is tightened up, it can be bent around, as illustrated in Figs. 2 and 3, to engage one of the side faces of the nut and thus lock the nut in place.

In Fig. 7, I show an alternative form of my invention wherein I furnish a tongue 11 which is secured by means of a hinge 12 to the end of the bolt. In this case the tongue 11 need not be as long as the tongue 8 as the tongue and nut can be swung clear of the open end of the slot to permit the insertion of the wires. In the form of construction illustrated in the other figures wherein the tongue 8 is furnished, such tongue must be of sufficient length to allow the nut 3 to be sufficiently spaced apart from the open end of the slot to permit the free insertion of the wires.

When two or more wires such as indicated by the numerals 13 in the drawing are being connected by means of my connecter, the nut 3 is unthreaded from the bolt 1 so that it is carried upon the tongue 8, this leaves the slot 2 clear for the reception of the wires as illustrated in Fig. 1. When the wires have been inserted the nut 3 is threaded back upon the bolt and as the nut 3 carries the washer element, such washer element will, under the influence of the nut, bear against the adjacent wire 13 thus pressing the wires towards the head of the slot whereby they are secured in place. The tongue 8 is then bent around into a position to lie against one of the nut faces whereby the nut is locked against rotation. In the form illustrated in Fig. 7, the hinged tongue 11 is not used as a lock for the nut.

From my description it will be seen that I have devised a very simple means for retaining a nut against loss in the type of connecter device as illustrated and described, but although I have shown my device as applied to this particular type of connecter it is to be understood that it has other possible uses and that it is not my intention to solely limit the application of my invention to the specific form of connecter as shown and described.

What I claim as my invention is:

1. In a wire connecter, the combination with a bolt element having an open ended slot extending upwardly therein for the reception of wires and a nut threadable upon the bolt to close the slot, of a bendable tongue protruding from the nut reception end of the bolt to receive the nut when it is disengaged from the bolt and adapted to be bent over to engage the nut and retain it against rotation when the nut is in position upon the bolt.

2. In a wire connecter, the combination with a bolt element having an open ended slot extending upwardly therein for the reception of wires and a nut threadable upon the bolt to close the slot, of a bendable tongue protruding from the nut reception end of the bolt to receive the nut when it is disengaged from the bolt and adapted to be bent over to engage a side face of the nut to retain the nut against rotation when it is in position upon the bolt.

FREDERICK GEORGE RIDGERS.